US012655888B2

(12) United States Patent
Dajic

(10) Patent No.: US 12,655,888 B2
(45) Date of Patent: Jun. 16, 2026

(54) MECHANICAL POWER TRANSMISSION MODULE

(71) Applicant: Bernard Controls, Gonesse (FR)

(72) Inventor: Ivan Dajic, Amy (FR)

(73) Assignee: Bernard Controls, Gonesse (FR)

( * ) Notice: Subject to any disclaimer, the term of this patent is extended or adjusted under 35 U.S.C. 154(b) by 136 days.

(21) Appl. No.: 18/701,793

(22) PCT Filed: Oct. 20, 2022

(86) PCT No.: PCT/FR2022/051993
§ 371 (c)(1),
(2) Date: Sep. 17, 2024

(87) PCT Pub. No.: WO2023/067285
PCT Pub. Date: Apr. 27, 2023

(65) Prior Publication Data
US 2025/0327532 A1 Oct. 23, 2025

(30) Foreign Application Priority Data

Oct. 21, 2021 (FR) ........................................ 2111181

(51) Int. Cl.
*F16H 3/54* (2006.01)
(52) U.S. Cl.
CPC ....... *F16H 3/54* (2013.01); *F16H 2200/0034* (2013.01); *F16H 2200/2005* (2013.01); *F16H 2200/2097* (2013.01)
(58) Field of Classification Search
CPC .... F16H 3/54; F16H 3/002; F16H 2200/0034; F16H 2200/2005; F16H 2200/2097; F16H 2200/2035
See application file for complete search history.

(56) References Cited

U.S. PATENT DOCUMENTS 7,874,953 B2 * 1/2011 Shamie ................... F16H 3/663
                                                    475/35
8,784,258 B2 * 7/2014 Hoffman ................. F16H 3/663
                                                    475/278
(Continued)

FOREIGN PATENT DOCUMENTS

CN       111733906 A    10/2020
CN       213628720 U    7/2021
FR       3065266 A1     10/2018

OTHER PUBLICATIONS

European Patent Office; International Search Report and Written Opinion dated Feb. 22, 2023 for PCT application No. PCT/FR2022/051993, with English translation (30 pages).

*Primary Examiner* — Eric Keasel
(74) *Attorney, Agent, or Firm* — Merchant & Gould P.C.

(57) ABSTRACT

A mechanical power transmission module (10) comprising a housing (100) and a plurality of parts forming an epicyclic gear train, one of the inputs/outputs (101) of which is immobilized in relation to the housing, the other two inputs/outputs comprising an input (120) and an output (130, 140), power being supplied by an input shaft (110) of the module, the input shaft (110) being coupled to the output assembly (130, 140) by means of the input assembly (120) in a first axial position of the shaft. The input assembly (120) comprises a through-bore (123) and the output assembly (130, 140) comprises direct coupling means (142), toward the through-bore (123), accessible in a second position obtained by axial translation.

8 Claims, 9 Drawing Sheets

(56) References Cited

U.S. PATENT DOCUMENTS

| | | | | |
|---|---|---|---|---|
| 9,366,321 B2 * | 6/2016 | Zhang | ..................... | B60K 17/08 |
| 10,247,280 B2 * | 4/2019 | Hoffman | .................. | F16H 3/666 |
| 10,641,357 B2 * | 5/2020 | Lepan | ..................... | F16K 31/53 |
| 10,655,708 B2 * | 5/2020 | Bernard | ................ | F16K 31/055 |
| 10,767,736 B2 * | 9/2020 | Lindstrom | ............. | B60K 6/387 |
| 11,118,658 B1 * | 9/2021 | Johnson | .................... | F16H 3/66 |
| 11,511,407 B2 * | 11/2022 | Nino | ....................... | B25F 5/001 |

* cited by examiner

MECHANICAL POWER TRANSMISSION MODULE

CROSS-REFERENCE TO RELATED APPLICATIONS

The present application is a national stage entry of International Application PCT/FR2022/051993 filed Oct. 20, 2022, which claims priority from FR2111181, filed Oct. 21, 2021, the disclosure of each of which is hereby incorporated by reference herein in its entirety.

The invention relates to a mechanical power transmission module, which can be used in particular for the manual manipulation of an industrial valve, as part of an intervention by an operator on an electric servo actuator, also known as an electric servomotor. Such a servomotor can be mounted on a valve in a complex installation such as a valve in the energy sector, particularly in nuclear power plants, or in the water sector, in the industrial sector such as cement plants, or in the oil and gas industry sector.

The invention applies to multi-turn, quarter-turn or more generally fractional-turn servomotors and to other types of electric actuators. The power transmission module can be used in various contexts.

It should be pointed out that while industrial valves, which are placed on fluid, liquid or gas pipes, are commonly controlled by a servomotor enslaving their position to an electronic position control, it is necessary to be able, with the same device, to operate them by hand, on the one hand, during installation and commissioning of the electric actuator, but also whenever human intervention is required, and this may be on a programmed basis, or conversely on an emergency situation in the event of difficulties on the industrial site requiring manual intervention, such as the loss of the power supply, for example. Setting up a manual control system is no easy matter, however, as the effort required is generally high, and provision of gearing systems are therefore necessary. It is also known that the actuator stroke can be long, which is a problem, as it lengthens the intervention time if the gearing is present over the entire stroke.

In this context, document FR3072746_A1 describes a method for manually operating a valve using a handwheel and power transmission by means of gears located in a housing. In one configuration, allowing a reduction in speed, in order to overcome a significant reduction in speed at the end of the valve closing stroke, for example the gears form an epicyclic gear train with a ring gear embedded in the housing, and, in another configuration, the gears ensure transmission without speed reduction between the input and output of the housing, which is appreciated at the start of the stroke, when the valve offers no particular resistance. The transition from the reduction configuration to the other configuration is accomplished by the axial displacement of a rod parallel to the axis and offset relative to it, which, as a function of its position, disengages the ring gear from the housing and immobilizes it in relation to the planet carrier. This configuration is achieved by pulling the rod out of the housing. Alternatively, the transition from one configuration to the other can be achieved by axial displacement of the ring gear for the same purpose, possibly obtained by axial displacement of the input handwheel and its axis. Here too, direct coupling of the input with the output is achieved by pulling the axis, this time the axis of the handwheel, toward the outside of the housing.

Also known from another document, WO2009027821_A1, is a power transmission mechanism comprising a housing in which gears are placed. In one configuration, the gears form an epicyclic gear train with a planet carrier that is embedded with the housing, and in another configuration offering a different gear ratio, the planet carrier is embedded with the ring gear of the epicyclic gear train and free relative to the housing. The transition from one configuration to the other is achieved either by axial displacement of the planet carrier, or by displacement of a ring surrounding the planet carrier and linked in rotation to it.

Another mechanism is disclosed in the same document WO2009027821_A1: in one configuration of this other mechanism, the gears form an epicyclic gear train with a planet carrier that is embedded with the housing, and in another configuration the sun gear is embedded with the ring gear of the epicyclic gear train and free relative to the planets. The transition from one configuration to the other is achieved by axial displacement of the sun. In these different implementations, a maneuver is carried out by acting on a mechanical control element accessible either on the front face of the housing through which the power is introduced, or on its lateral wall.

These different solutions remain complicated to use for certain operators who are unfamiliar with the internal workings of the proposed devices.

There is thus a need for a solution that is intuitive for the operator, who is primarily interested in handling the handwheel and does not necessarily have in mind the need to make modifications to the internal drive chain system.

The invention aims to solve this problem by proposing a mechanical power transmission module comprising a housing and a plurality of coaxially mounted mechanical parts, said plurality of mechanical parts forming an epicyclic gear train, one of the inputs/outputs of which is immobilized relative to the housing, the other two inputs/outputs of the epicyclic gear train being formed by an input assembly and an output assembly, the power being further supplied to the plurality of mechanical parts by an input shaft of the transmission module coaxial with the parts of the plurality of mechanical parts, the input shaft being coupled with the output assembly by means of the input assembly in a first axial position of the input shaft relative to the housing defining a first gear ratio of the transmission module.

Thus, an epicyclic gear train is provided, allowing a reduction ratio to be implemented. Nevertheless, the power transmission module is particular in that the input assembly comprises a central through-bore, said through-bore and the input shaft bearing complementary splines for coupling the input shaft to the input assembly, the input shaft, slidably mounted relative to the housing, further sliding in the through bore to couple with the output assembly in a second position of the input shaft relative to the housing, differing from the first position by an axial translation, in which said complementary splines are no longer engaged, and which defines a second gear ratio of the transmission module.

Thanks to this solution, it is possible to change the reduction or gear ratio between the input shaft and the output assembly by axial displacement of the input shaft, since in one position the power passes through the epicyclic gear train, whereas it bypasses it in the second position: indeed, in this second position, the input shaft is directly coupled with the output assembly. This remarkable result is achieved by the presence of a splined bore in the input assembly, thanks to the sliding nature of the input shaft and by the coupling means allowing the input shaft to be coupled to the output assembly, while disengaging the input shaft from the input assembly.

The features to be set out now are optional and advantageous.

The means for coupling the output assembly to the input shaft may comprise splines within a central bore of the output assembly open toward the through bore and splines borne by the input shaft. This is an easy solution to implement in parallel with the splines existing between the input shaft and the input assembly. The splines of the input shaft engaging the input assembly and that engaging the output assembly can be different or can be the same. In the embodiment which will be presented in the drawings, they are different, separated by a smooth section of the input shaft.

The input shaft in the first position can be pushed further into the housing than in the second position. This allows the operator to engage the reduction gear by pushing the handwheel, and to engage the direct coupling by pulling it back, which is an easy and intuitive movement.

Said input assembly can constitute the planet carrier of the epicyclic gear train equipped with its planet gears, coupled without reduction to the input shaft in the first position, the through bore being a planet carrier bore. This is a simple and compact version of the invention.

The output assembly may comprise a bored pinion coupled to the input assembly by external teeth and a central driver, mounted relative to each other in an axial sliding connection, the driver comprising bearing means to resist axial thrust in one direction by a control rod and to resist axial thrust by the input shaft in the other direction, and splines, under the effect of the axial thrusts, for coupling and decoupling relative to the transmission module output. This allows to act on the control module from the part opposite the handwheel, at the other end of the worm screw, in other words, on the electric motor side. In particular, this allows a neutral position to be set up, whereby the control rod pushes the driver, which disengages from the output shaft. A push on the input shaft allows to re-engage the drive on the output shaft.

In other words, the feature in question allows an additional, axial movement to be introduced, to control a mechanical actuator in translation on the axis, with the aid of a thrust effected by a solid face. A mechanical actuator in translation can be connected to another power transmission module, for example an electric motor, coupled to the same receiver, for example a worm screw, as the output assembly of the power transmission module.

A spring can be placed between the driver and the bored pinion so as to oppose slippage of the driver in relation to the bored pinion when the input shaft displaces relative to the output assembly. This is a simple way of ensuring that the parts inside the mechanism displace correctly between the different positions: on the one hand you can have a neutral, but you can also have two different gear ratios.

A transmission module leaf spring can be present between the input assembly and a bearing connecting the input shaft to the housing, retaining the shaft despite its weight, and cooperating with a form borne by the input shaft to signal to an operator axially displacing the input shaft that it has reached the first or second position. Such a spring can be used to keep the shaft in a stable position even though it is arranged vertically, which is a solution offered to the industrial user of the power transmission module and associated servomotor. If the shaft is vertical, gravity pulls it downward and it is necessary to hold it, which the proposed leaf spring can do.

The input assembly can be the planet carrier of the epicyclic gear train, and the output assembly is the sun pinion gear of the epicyclic gear train. This is a well-characterized planetary gear arrangement, but other input/output arrangements are possible. The input assembly can be coupled without reduction to the input shaft in the first position. This is a simple solution to implement. The output assembly can be coupled without reduction to an output shaft of the transmission module. This is also a simple solution to implement.

The invention also relates to the use of a mechanical power transmission module as presented above and hereinafter, for the initial commissioning of an electric servomotor on a valve or vane for controlling a fluid flowing in a pipeline, or for a safety operation on said valve, the valve or vane being operated by means of a transmission shaft bearing a wheel, the input shaft being coupled to a handwheel constituting a manual control, the output assembly being coupled to a worm screw which engages the wheel.

The invention will be presented in more detail in connection with the following figures.

Figure 1:
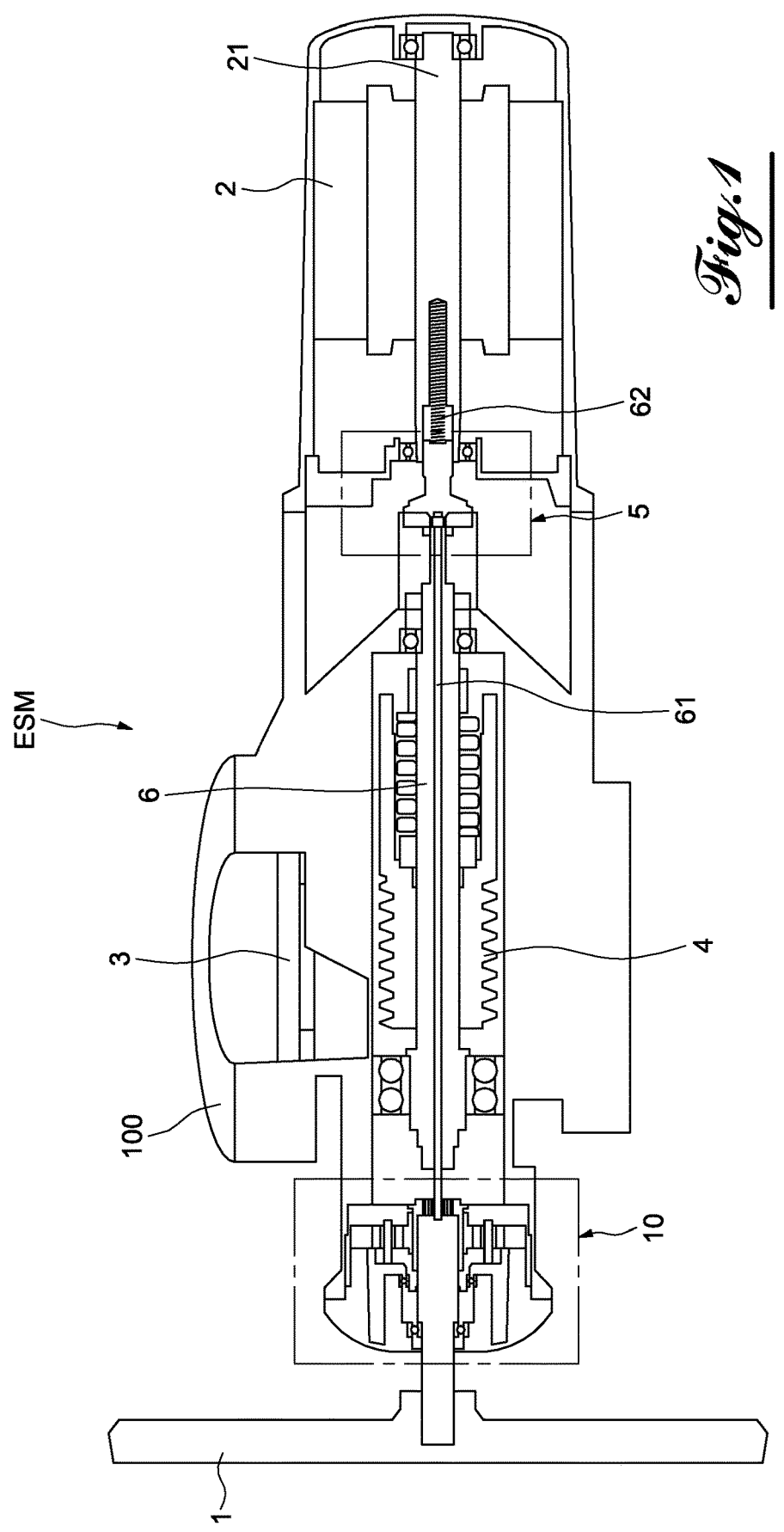
FIG. 1 shows a general view of a servomotor assembly according to the invention, seen in longitudinal section.

FIG. 1 shows a general view of a servomotor assembly (ESM) according to the invention. The servomotor assembly comprises a handwheel 1, an electric motor 2, a worm screw and associated wheel assembly, of which the impeller 3 and worm screw 4 are shown, as well as a clutch system 5 and a mechanical system known as a through-actuator 6. The impeller 3 is dimensioned to be mounted on the shaft of an industrial valve or vane (not shown). Depending on the orientation of the shaft of the valve or vane, the orientation of the ESM servomotor assembly, as seen from the axis common to the electric motor 2, the handwheel 1 and the worm screw 4, can be either horizontal or vertical.

The handwheel 1 and the electric motor 2 are positioned coaxially with the worm screw 4 and coupled or able to be coupled with either of its two ends respectively. The clutch release system 5 is able to uncouple the electric motor 2 at the first end (right in the figure) from the worm screw, or to couple them, and the power transmission module is able to effect at least one gear change between the handwheel 1 and the worm screw 4, or to uncouple these two elements, and in a reversible manner, recouple them, at the second end (left in the figure).

The through-actuator 6 is a purely mechanical system, in the embodiment presented, configured to transmit a configuration change from the clutch release system 5 toward the power transmission module 10 or vice versa from the power transmission module 10 to the clutch release system 5. The through-actuator 6 does not transmit mechanical power but, allows switching from one configuration of the clutch disengagement system 5 toward another or from one configuration of the power transmission module 10 toward another, respectively, under the control of a signal from the other end in relation to the worm screw 4. In particular, the through-actuator 6 is constructed on the basis of a through rod 61 inserted into a through bore of the worm screw 4. The through rod 61 opens out at both ends of the worm screw 4 and transmits, by its axial translation (in other words longitudinal) to the left or its translation to the right, a command which causes a changeover at the other end of the worm screw 4.

The tilting action of the through-actuator 6 is now specified.

When the electric motor 2, initially stationary and decoupled from the worm screw 4, starts moving under the action of a motor command, often received by a remote communication means, the electric motor 2 is coupled to the worm screw 4 by the clutch release system 5 and a motor connection spring 62, and pushes the through-actuator 6 toward the power transmission module 10, and causes, by means of the through-actuator 6, the decoupling of the handwheel 1 from the worm screw 4.

Conversely, when the handwheel 1 is pushed by an operator to press its shaft into the housing of the power transmission module 10, the electric motor 2 is decoupled from the worm screw 4 by the clutch release system 5, which is opened by the through-actuator 6, the displacement of which is caused by that of the shaft of the handwheel 1. At the same time, the worm screw 4 is coupled to the handwheel by means of the power transmission module 10, as will be explained in detail in relation to the following figures, in particular the transition from FIG. 2 to FIG. 3.

Figure 2:
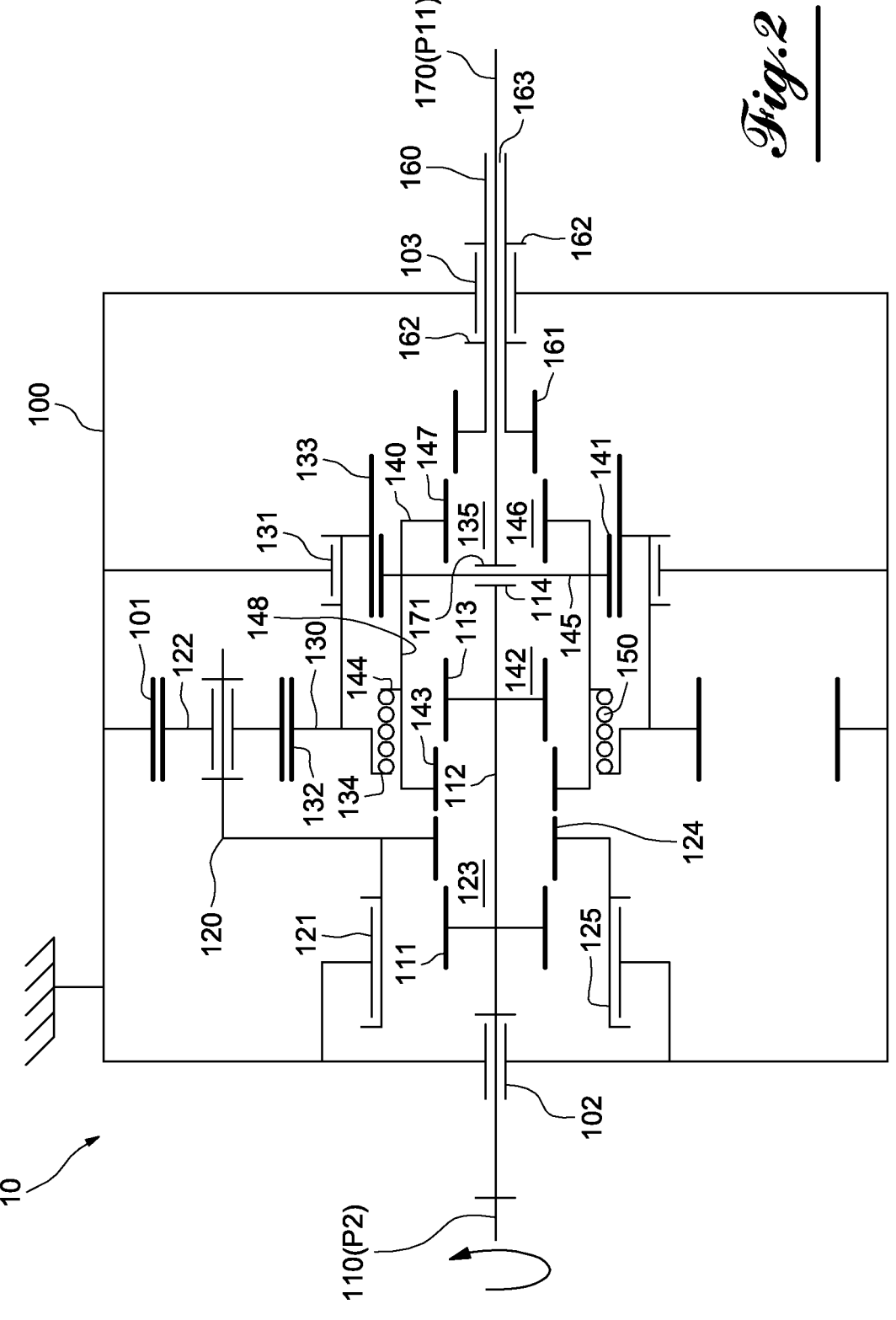
FIG. 2 shows one embodiment of a power transmission module according to the invention, in neutral position, with no gear ratio engaged.

FIG. 2 shows one embodiment of a power transmission module 10 according to the invention.

The power transmission module 10 comprises in a housing 100, a planet carrier 120, a bored pinion 130, a part of revolution constituting externally a shaft section and comprising two internal bores (these elements will be described later) qualified as a driver 140, a compression spring 150 and a leaf spring referred to as the position selection leaf spring 180.

The power transmission module 10, as a function of its state of configuration, can receive mechanical power as input on an input shaft 110, in this case the shaft of a handwheel (the handwheel 1 in FIG. 1), and supply power on an output shaft 160, in this case a worm screw. These two shafts are coaxial. In FIG. 2, they are uncoupled, with the result that rotation of the input shaft 110, which receives the power, is not transmitted to the output shaft 160, which is stationary.

Furthermore, a control rod 170, or linkage, takes advantage of the fact that the output shaft is hollow to be introduced inside the mechanism presented, through the inside of the output shaft 160. This control rod 170 is the end of the through-actuator 6 presented in FIG. 1.

The housing 100 comprises on its inner face of the toothed ring gear 101, toothed on the interior, the role of which will be commented on below, an input pivot link 102 (in this case a sliding pivot) to accommodate the input shaft 110 and an output pivot link 103 (in this case a non-sliding pivot) to hold the output shaft 160 axially.

The ring gear 101 and the two input and output pivot links 102 and 103 are coaxial.

The input shaft 110 is in a sliding pivot link with the housing 100, the translation being limited by stops.

The portion of the input shaft 110 inside the housing 100 successively presents, in order from the input pivot link 102 toward the inside of the housing 100, first splines referred to as the first splines of the input shaft 111 (on a cylindrical section), a non-splined shaft portion 112 (another cylindrical section) and second splines referred to as the second splines of the input shaft 113 (on a third cylindrical section), then its end referred to as the input shaft end 114.

The planet carrier 120 is mounted opposite the housing 100 by means of a bearing 121 coaxial with the input 102 and the output 103 pivot links and with the ring gear 101.

The planet carrier 120 comprises one or more planets 122, all of which mesh with the ring gear 101. Their axes of rotation are parallel to the axis of rotation of the planet carrier 120.

The planet carrier 120 comprises a through bore 123 coaxial with the input 102 and the output 103 pivot links as well as with the ring gear 101 and is dimensioned to accommodate the input shaft 110 inside. The through bore 123 comprises a splined cylindrical section referred to as the splined portion of the planet carrier 124 and a smooth, non-splined cylindrical section referred to as the non-splined portion of the planet carrier bore 125, which is closer to the input pivot link 102 and the handwheel than the splined portion of the planet carrier 124.

The power transmission module 10 also comprises a bored pinion 130 mounted with a pivot link 131 (non-slip) relative to the housing 100, coaxially with the input shaft 110 and output shaft 160 as well as with the planet carrier 120. This bored pinion 130 forms all or part of the sun gear of an epicyclic gear train based on the planet carrier 120, and the ring gear 101 of which constitutes the other planet pinion. The bored pinion 130 comprises external gear teeth, referred to as bored pinion teeth 132, which thus mesh with the planet(s) 122.

Thus, the planets all mesh with the bored pinion 130 on their side facing the axis of the power transmission module 10, in other words, radially opposite the ring gear 101.

The bored pinion 130 comprises a through bore coaxial with the input shaft 110 and the through bore 123 of the planet carrier 120, this bore of the bored pinion being referred to as the drive receiving bore 135.

The bored pinion 130 carries on the surface of this drive receiving bore 135, splines referred to as the sliding splines 133, for coupling to the driver which has a long axial length, to allow the sliding of the shorter splines, which will be presented later.

The driver 140 is a hollow cylindrical part of revolution arranged coaxially with the input shaft 110 and the through bore 123 of the planet carrier 120. It carries splines on its outer surface, known as the external drive splines 141.

The drive-coupling sliding splines 133 of the bored pinion 130 are engaged with the external drive splines 141. But the drive-coupling sliding splines 133 of the bored pinion 130 have a greater length, which can be double, more than double or less than double, than the external drive splines 141, and these interact with the part of the drive-coupling sliding splines 133 that is located on the side of the input pivot link 102.

The driver 140 is also a hollow cylindrical part of revolution. However, it is not hollow from end to end, and comprises a wall 145 transverse to the axis of the power transmission module 10.

The wall 145 constitutes, on the side of the input pivot link 102, a bottom for the drive bore opening on the input pivot link 102 side, referred to as the direct handwheel coupling bore 142, and a stop for the input shaft 110 when the latter is inserted into the driver 140.

The drive input bore or direct handwheel coupling bore 142 carries on its surface splines referred to as the direct coupling splines 143, for coupling the driver with the input shaft 110. These splines define a cylindrical section of the bore, which is followed, toward the bottom of the bore, opposite the input pivot link 102, by a smooth cylindrical section, without splines, referred to as the non-splined portion of the direct coupling bore 148.

On the other side of the wall 145, the driver 140 comprises splines directed toward the axis in its bore opening on the side of the output pivot link 103. This bore is referred to as the worm coupling bore 146, and the splines are referred to as the drive output splines 147.

Finally, on its periphery, the driver 140 further comprises an annular peripheral surface 144, for lateral support, in a plane perpendicular to the axis, for the lateral support of a spring, and facing the side of the housing on which the input shaft 110 is located.

Facing this peripheral annular surface 144 for lateral support, the bored pinion 130 itself comprises, an annular surface 134 for lateral support, in a plane perpendicular to the axis, for lateral support of a spring, and facing the side of the housing on which the output shaft 160 is located.

The compression spring 150 is positioned between the annular surface 134 for lateral support of the bored pinion 130 and the lateral support surface 144 of the driver 140, which face each other.

The output shaft 160 comprises external splines, referred to as output shaft splines 161, directed toward the outside of the shaft, and is locked in axial translation by translation stops 162 integrated into the housing 100. The output shaft 160 is also a hollow shaft comprising a bore referred to as the output shaft bore 163.

A control rod 170 is inserted into the output shaft bore 163, and the control rod end 171 comes into contact with the wall 145 of the driver, in a position referred to as the first control rod position P11, pressed into the housing 100.

In FIG. 2, the input shaft 110 is not coupled to any of the elements contained in the housing 100, with the result that if it is driven in rotation, its rotation is free and does not affect the planet carrier 120, the bored pinion 130, the driver 140 and the output shaft 160. This absence of coupling is due to the fact that, in its position P2, shown in FIG. 2, the input shaft 110 has its first splines 111 facing the non-splined portion of the planet carrier bore 125 and its second splines 113 facing the non-splined portion of the direct coupling bore 148. The splined portion of the planet carrier 124 and the direct coupling splines 143 face the non-splined portion 112 of the input shaft. The length of this non-splined portion has been chosen to ensure the absence of coupling in position P2.

Such as is shown in FIG. 2, in this neutral position, on the one hand, the control rod 170 has retracted into the housing 100 (this is the first control rod position P11), and the control rod end 171 has displaced the driver 140 toward the left, resulting in disengagement of the driver output splines 147 from the output shaft splines 161.

On the other hand, the first splines of the input shaft 111 are on the side of the input pivot link 102 relative to the splined portion of the planet carrier 124 and are not engaged with it. Finally, the second splines of the input shaft 113 are on the side of the output pivot link 103 relative to the direct coupling splines 143, without interacting with the latter. On the other hand, it is the non-splined shaft portion 112 that faces to its right to both the splined portion of the planet carrier 124 and the direct coupling splines 143.

These relative positions of the splines guarantee free rotation of the input shaft 110: it is linked neither to the planet carrier 120 nor to the driver 140.

There is also free rotation of the worm, in other words, the output shaft 160, since it is not connected to the driver 140.

In the configuration shown in FIG. 2, the compression spring 150 is compressed, and is ready to assist relative axial displacement of the driver 140 in relation to the bored pinion 130.

Figure 3:
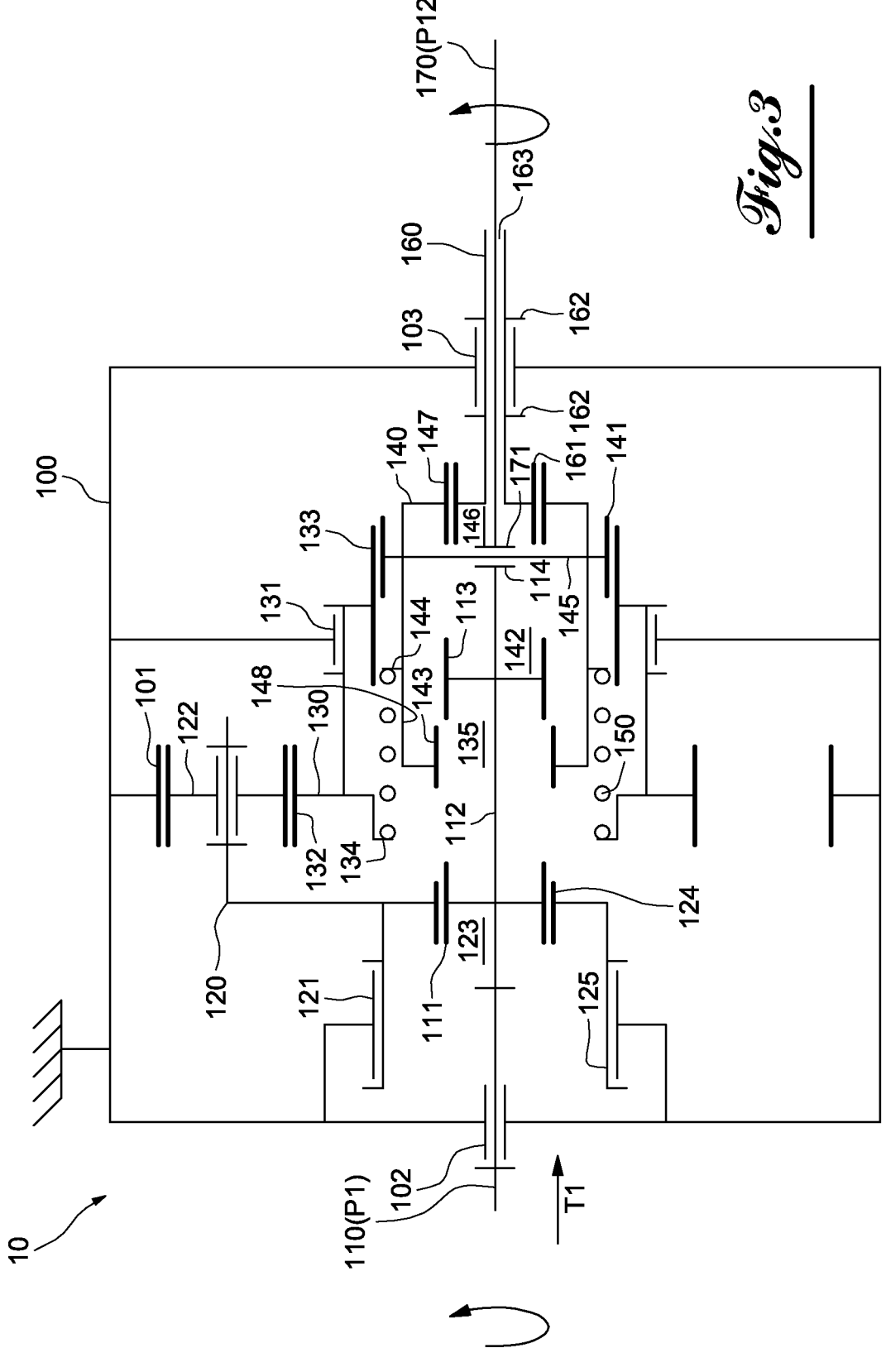
FIG. 3 shows the device of FIG. 1, in a gear ratio engagement configuration by a factor of 3:1.

FIG. 3 shows the result of the translation T1 (noted as first translation) of the input shaft 110 toward the interior of the housing 100 thanks to the input link 102, which has been referred to as a sliding pivot link. The input shaft 110 is brought to a stop toward the interior, as part of the link 102. The stop is provided by the housing 100 or any other element linked to the housing, as will be seen in FIGS. 5 to 7.

This translation is aided by the compression spring 150, which expands and pushes the driver 140 toward the part of the mechanism opposite the input link 102. At the end of this translation, the input shaft 110 is in a position referred to as the first input shaft position P1: the input shaft 110 is pressed into the housing 100. The driver 140 is also displaced toward the output link 103, and has pushed the control rod 170 toward the exterior of the housing.

In this situation shown in FIG. 3, the first splines of the input shaft 111 are engaged with the splined portion of the planet carrier 124, as the input shaft 110 has advanced into the housing, while the planet carrier 120 has not moved.

The second splines of the input shaft 113, on the other hand, do not interact with the direct coupling splines 143, as these still face the non-splined portion 112, of the input shaft 110. More precisely, the second splines of the input shaft 113 and the direct coupling splines 143 have followed the same movement toward the right of the mechanism, and as in FIG. 2, are not in contact.

The input shaft 110 therefore drives in rotation the planet carrier 120, which by means of the planets 122 drives in rotation the bored pinion 130.

In the case of the bored pinion 130, the drive-coupling sliding splines 133 are always engaged with the external drive splines 141. As can be seen, the drive coupling sliding splines 133 of the bored pinion 130 are longer than the external drive splines 141, and these interact this time with the part of the drive coupling sliding splines 133 that is located on the side of the output pivot link 103, as a result of the input shaft 110 progressing through the housing 100 and into the direct handwheel coupling bore 142, the end of the input shaft 114 has pushed against the wall 145 and the driver 140 has displaced toward the output pivot link 103.

The bored pinion 130 therefore drives the driver 140 in rotation, due to the continued engagement of the splines just mentioned.

As mentioned, the end of the input shaft 114 has pushed the driver 140, by bearing on the wall 145, toward the output pivot link 103 and, as a result of this displacement, the drive output splines of the 147 and the output shaft splines 161 are in interaction with each other and a rotation of the driver 140 necessarily leads to a rotation of the output shaft 160, in other words, the worm screw.

The driver 140 then itself drives the output shaft 160 in rotation.

In addition, because the driver 140 has been displaced toward the output pivot link 103, its solid wall 140 has pushed the control rod 170 toward the output pivot link. The control rod 170 is now displaced toward the exterior of the housing 100, in a second position of the control rod P12.

Figure 4:
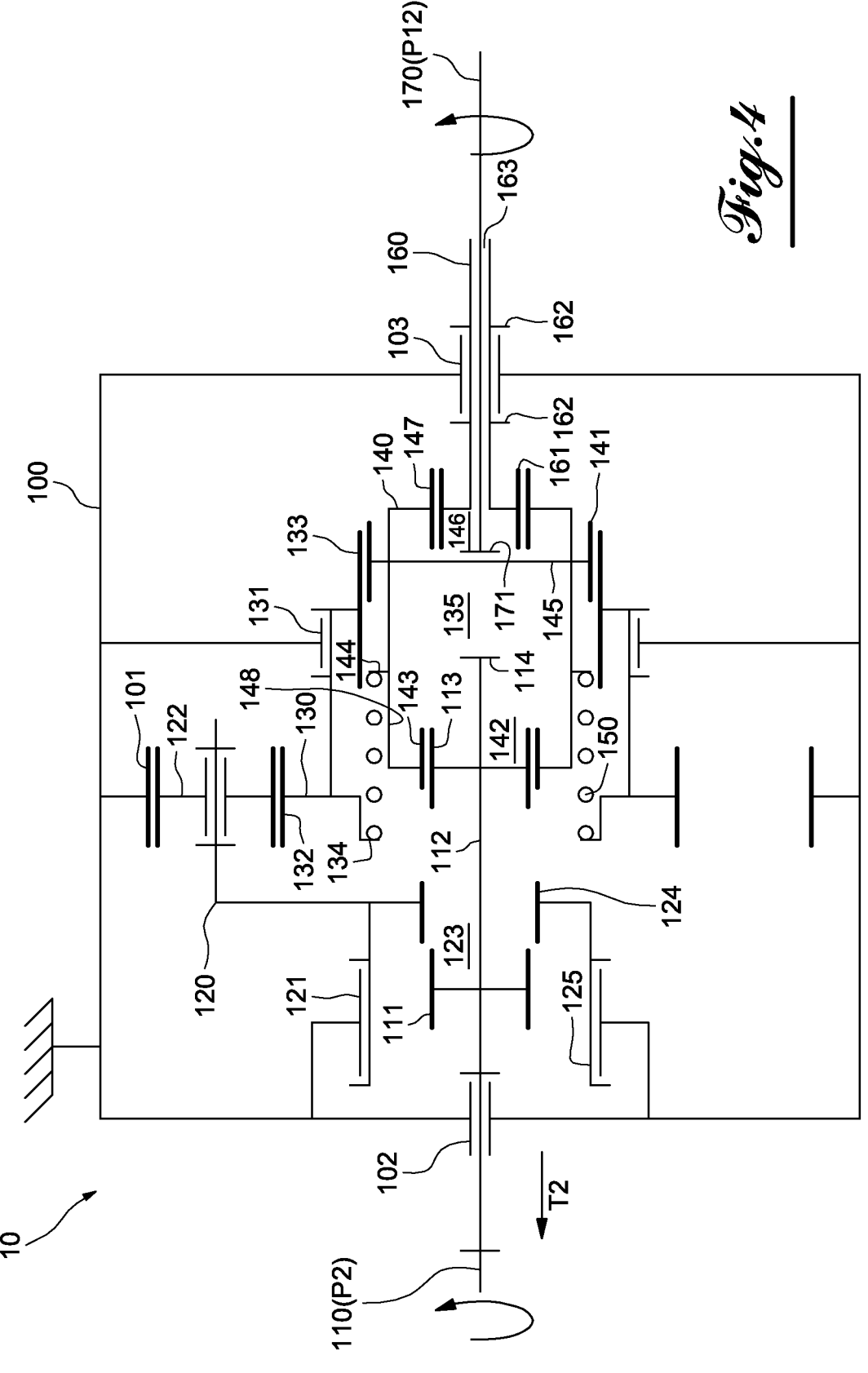
FIG. 4 shows the device of FIG. 1, in a configuration of direct power transmission, without gear reduction.

The consequence of a translation of the input shaft 110 toward the outside of the housing 100 from the configuration of FIG. 3, as shown in FIG. 4 will now be discussed. This translation is referred to as the second translation T2. The input shaft 110 is brought to a stop toward the exterior, as part of the input link 102, which has been referred to as a sliding pivot link. The stop is ensured by the housing 100. At the end of this translation, the input shaft 110 is in a position referred to as the second position of the input shaft P2, which is the one presented in FIG. 2.

The effect of this translation is to disengage the first splines of the input shaft 111 from the splined portion of the planet carrier 124. Indeed, it should be remembered that the planet carrier 120 is immobilized in axial translation and therefore does not move back when the input shaft 110 moves back.

The translation also has the effect of engaging the second splines of the input shaft 113 with the direct coupling splines 143 of the driver 140.

The compression spring 150 indeed, maintains the driver 140 in the position it occupied in FIG. 3, and the external drive splines 141 remain engaged with the same portion of the drive coupling sliding splines 133, without relative sliding of the driver 140 in relation to the bored pinion 130. For the same reason, due to the opposition of the compression spring 150, the output shaft splines 161 remain engaged with the drive output splines 147.

Thus, thanks to the compression spring 150, the second splines of the input shaft 113 engage with the direct coupling splines 143 of the driver 140, the driver 140 being stationary, while the input shaft moves back to the position it occupied in the configuration shown in FIG. 2, in which the driver was itself offset toward the interior of the housing, away from the output, and uncoupled from the output shaft, which is not the case in FIG. 4.

As a result, in FIG. 4, the rotation of the input shaft 110 about its axis directly drives the driver 140 in rotation, without torque being transmitted by means of the planet carrier 120 and the bored pinion 130. The driver 140 then drives the output shaft 160 in rotation.

A further configuration change will now be discussed, which may be the triggering of the electric motor of the servomotor. Starting from the configuration shown in FIG. 4, in which the control rod is in its second position P12, a push on the control rod 170 toward the interior of the housing displaces the driver 140, by bearing on the control rod end 170 against the wall 145, toward the input pivot link 102, against the spring 150, which opposes the resistance but is nonetheless compressed.

The effect of translation is to disengage the second splines of the input shaft 113 from the direct coupling splines 143 of the driver 140. Indeed, the input shaft 110 is in abutment and does not move backward—it is therefore not driven in translation by the driver 140, and the direct coupling splines 143 therefore disengage from the splines 113, and end up in line with the non-splined portion 112.

The external drive splines 141 remain engaged with the sliding splines 133 for coupling to the driver, but with sliding relative to the driver 140 in relation to the bored pinion 130. The drive output splines 147 disengage from the output shaft splines 161, since the output shaft 160 is not movable in translation in relation to the housing 100.

The configuration shown in FIG. 2 is restored, with the control rod 170 in its first position P11, in other words, pushed into the housing 100.

Figure 5:
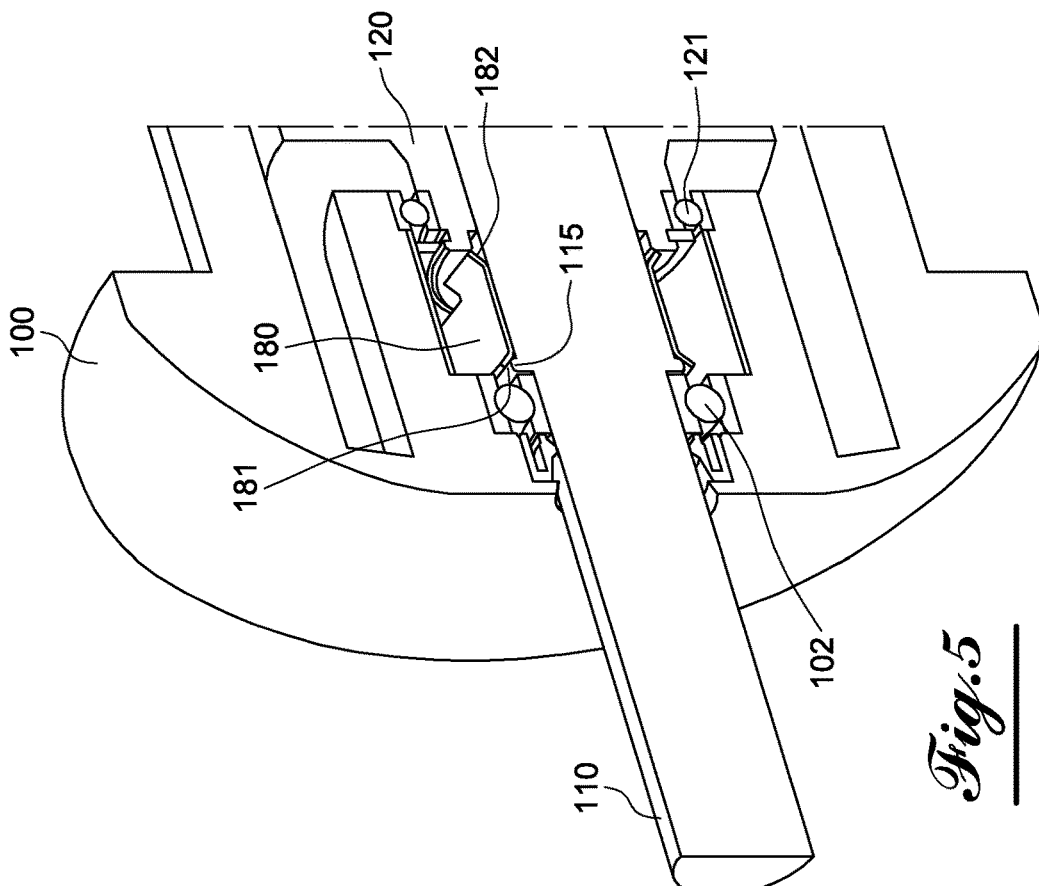
FIG. 5 shows an aspect of a power transmission module according to FIGS. 2 to 4, in this case a handling aid mechanism.

FIG. 5 shows an aspect of the assembly of the input shaft 110 in relation to the housing 100. The input shaft 110 is articulated in relation to the housing 100 by means of a ball bearing, which is an essential element of the input pivot link 102. The input shaft 110 also carries a peripheral rib on its circumference forming, in cross-section, a pin known as a positioning pin 115. This pin is in contact with a leaf spring referred to as a position selection leaf spring 180. The leaf of this spring is bent to offer two stable positions to the input shaft 110 by offering two housings offset along the axis of the input shaft 110 to accommodate the positioning pin 115 in two offset positions corresponding respectively to the engagement of the first splines of the input shaft 111 with the splined portion of the planet carrier 124 and to the engagement of the direct coupling splines 143 with the second splines of the input shaft 113. The position selection leaf spring 180 and the positioning pin 115 cooperate with each other and have an additional function, which may furthermore be considered as their main function: they allow the weight of the handwheel 1, when the axis is positioned vertically, to be supported so that the handwheel 1 and its shaft (input shaft 110) do not displace as a result of gravity. This function is not used if the shaft is placed horizontally, but the choice of orientation is left to the industrial user of the system.

FIG. 5 shows the system with the input shaft 110 pulled toward the exterior of the housing 100, and the positioning pin 115 consequently placed in the housing closest to the ball bearing of the input pivot link 102, or the first position indication space 181.

Figure 6:
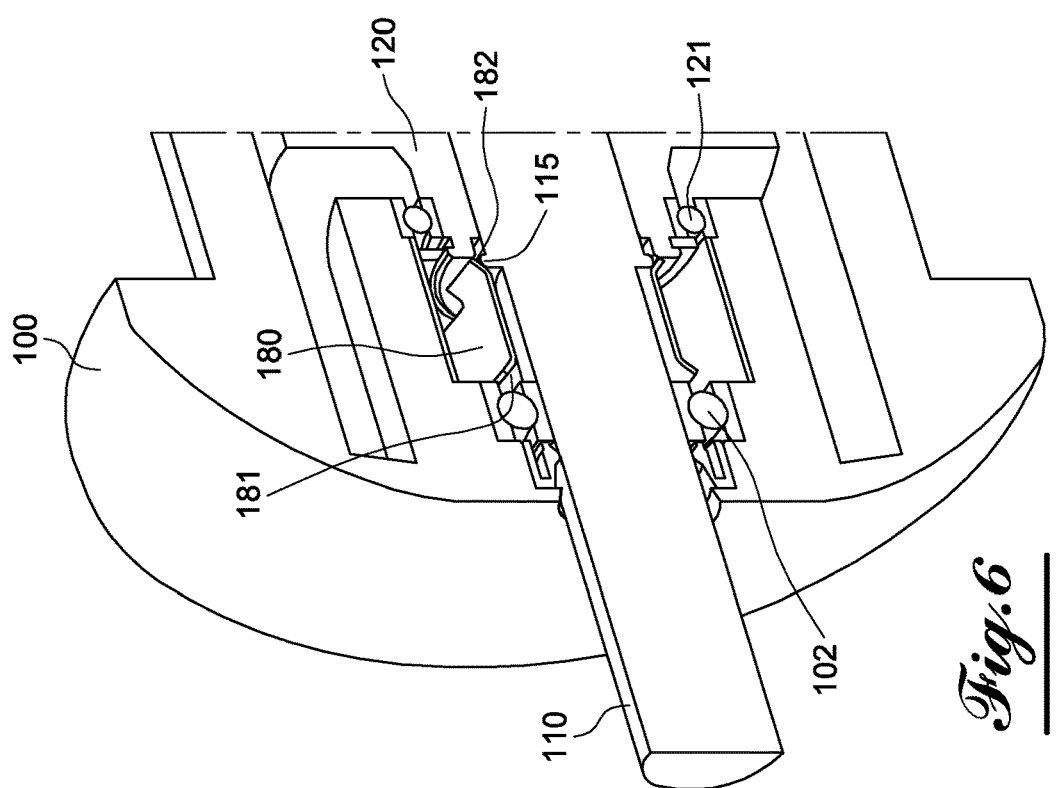
FIGS. 6 and 7 show the handling aid mechanism in two different positions.

FIG. 6 shows the system with the input shaft 110 pushed toward the interior of the housing 100, and the positioning pin 115 consequently placed in the housing closest to the planet carrier 120, or the second position indication space 182.

Figure 7:
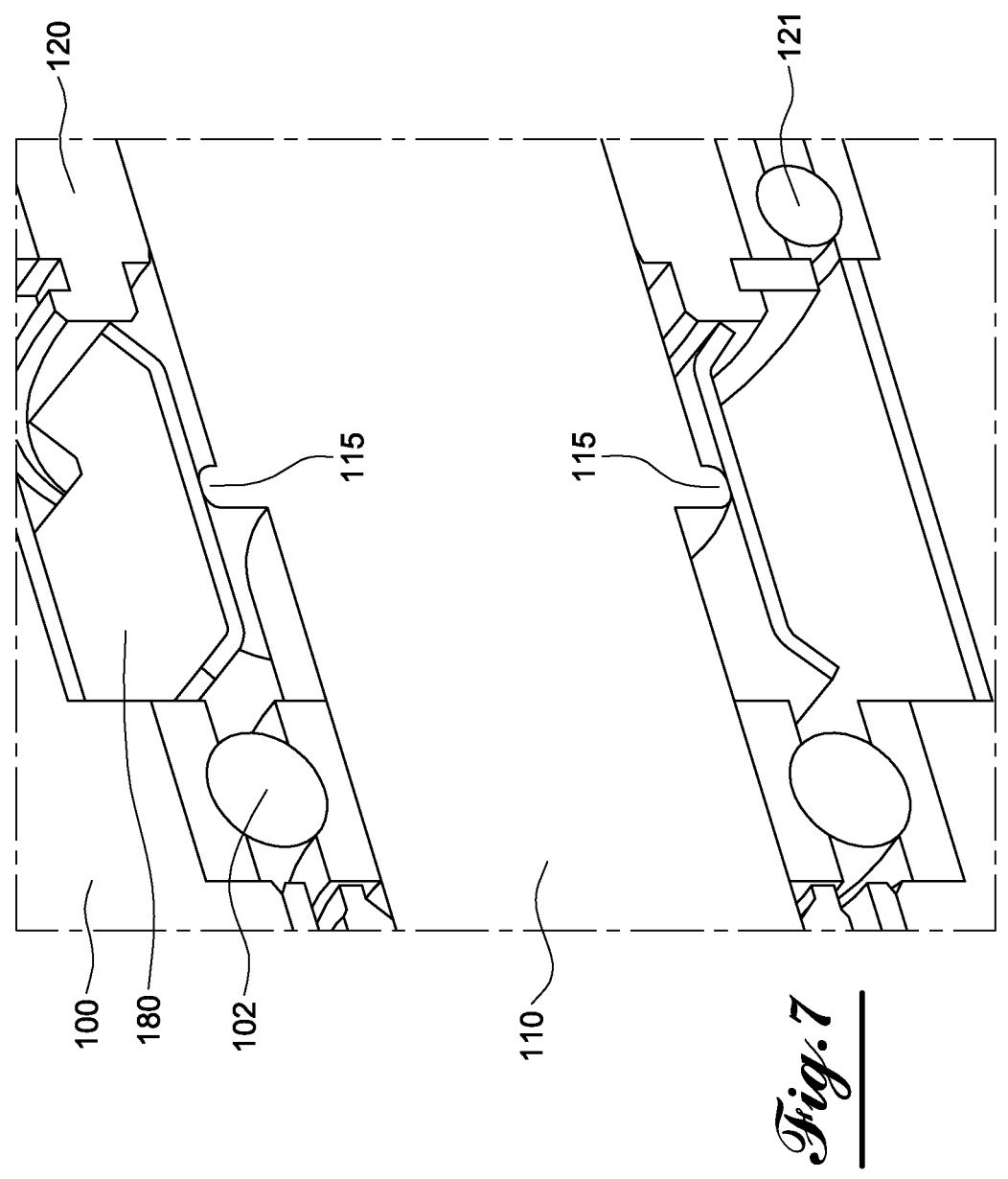

FIG. 7 shows the system with the input shaft 110 in an intermediate position between the two functional positions presented above: it can be seen that the leaf of the position selection leaf spring 180 is constrained by the presence of the positioning pin 115 in this intermediate position, in which no housing is provided to accommodate the positioning pin 115: as a result, the position is unstable, or uncomfortable, for the operator who is maneuvering the handwheel 1 (the axis of which is the input shaft 110), and understands that, from the resistance felt while maneuvering the handwheel 1, that the functional position sought, has not yet been reached. Consequently, the operator continues to turn the handwheel 1 until a more stable or welcome position is felt, which is the case when the positioning pin 115 reaches either the first position indication space 181 or the second position indication space 182 (depending on the direction in which the handwheel is turned).

The handwheel is often operated by hand, but it is provided, in some implementations to be operated by an electric or pneumatic motor, to which it is then connected by a bushing. This then makes maneuvering faster. All mechanism components are dimensioned to withstand high rotation speeds. The system is mounted on bearings.

The invention takes other forms, within the scope of the claims.

In particular, the presence of a sliding connection between the driver 140 and the bored pinion 130 is not indispensable to the realization of the invention in its greatest generality. The bored pinion 130 and the driver 140 can be replaced by a single part constituting a bored sun gear, which then does not participate in uncoupling the handwheel 1 from the worm screw 4 according to the above principles.

In addition, it is possible to position the splines in such a way that direct coupling is obtained by pushing the handwheel, and transmission by the epicyclic gear train is obtained by pulling the handwheel. This can be achieved by providing a single spline-bearing section on the input shaft 110, which in one position engages the planet carrier, and in the other position engages the driver. This is compatible with the implementation of a sliding connection between the driver and the bored pinion, by displacing the support points of the spring 150.

Furthermore, it is not necessary for the direct coupling between the input shaft and the driver to take place in a bore in the driver: this can, in one alternative, carry the external splines on a small diameter which enters a bore made in the shaft, which in turn would carry the internal splines engaging the external splines of the driver. Or, the coupling between the input shaft and the driver can be achieved by means of various forms of dog.

Alternatively, a reduction stage can be placed between the input shaft and the planet carrier.

Figure 8:
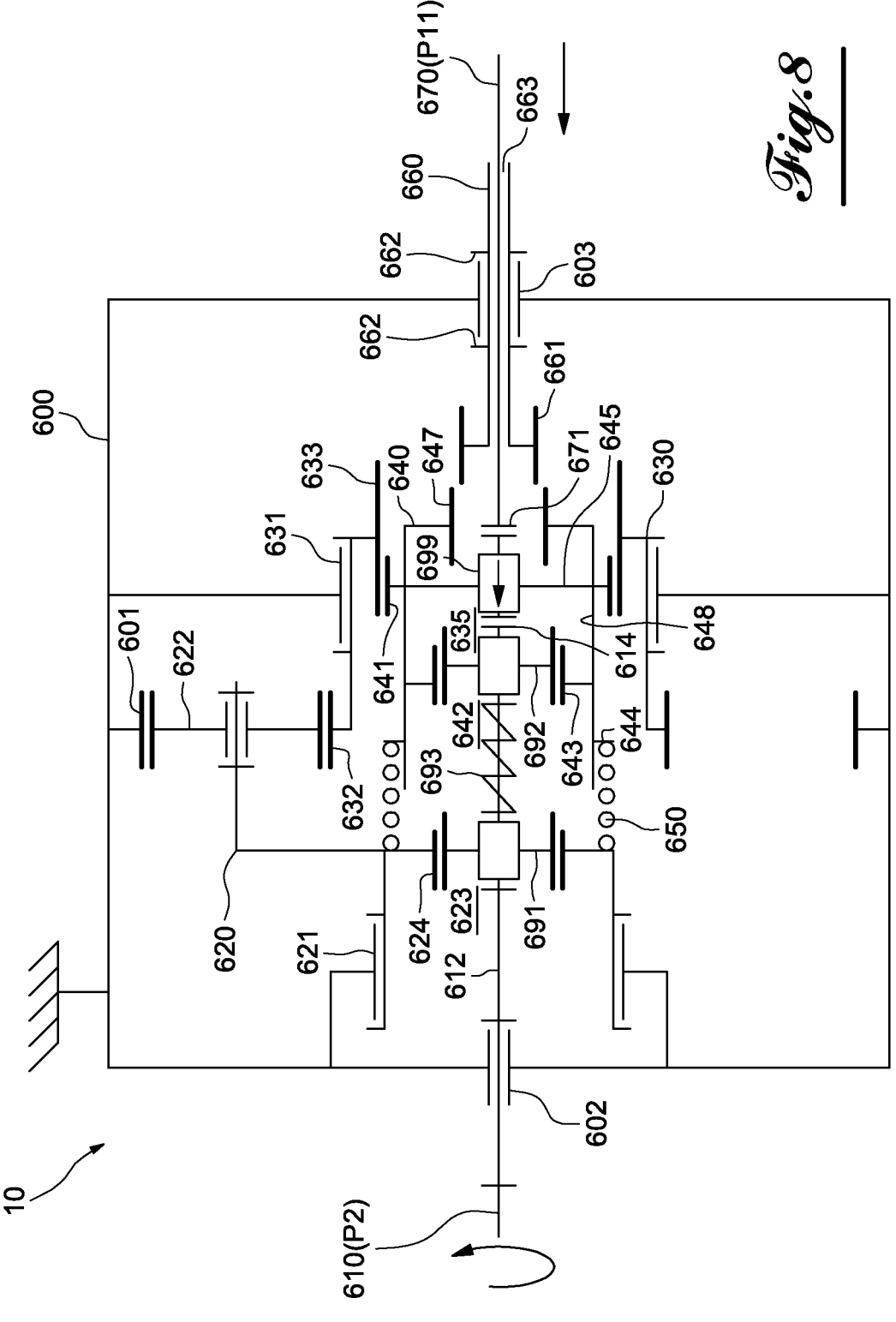
FIGS. 8 to 10 show a second embodiment.

FIG. 8 shows a second embodiment of a power transmission module 10 according to the invention.

As in the first embodiment, the power transmission module 10 comprises, in a housing 600, a planet carrier 620, a bored pinion, a part having a generally rotational symmetry, constituting an external shaft section and comprising two internal bores (these elements will be described later) referred to as a driver 640 and a compression spring 650.

As in the first embodiment, the power transmission module 10, as a function of its state of configuration, can receive mechanical input power on an input shaft 610, the handwheel shaft, and supply power on an output shaft 660, in this case a worm screw. These two shafts are coaxial. In FIG. 8, they are uncoupled, with the result that rotation of the input shaft 610, which receives the power, is not transmitted to the output shaft 660, which is stationary (or vice versa). Thus, the gearbox is in neutral.

Furthermore, as in the first embodiment, a control rod 670, or linkage takes advantage of the fact that the output shaft is hollow to be inserted inside the mechanism presented, through the interior of the output shaft 660. This control rod 670 is the end of the through-actuator 6 presented in FIG. 1.

As in the first embodiment, the housing 600 comprises on its inner face a toothed ring gear 601, toothed toward the interior, an input pivot link 602 (a sliding pivot) for receiving the input shaft 610 and an output pivot link 603 (a non-sliding pivot) for axially holding the output shaft 660. The toothed ring gear 601 and the two input and output pivot links 602 and 603 are coaxial. The input shaft 610 is in sliding pivot connection with the housing 600, the translation being limited by stops in both directions.

The portion of the input shaft 610 inside the casing 600 carries successively, in order from the input pivot link 602 toward the interior of the casing 100, a non-splined portion 612, a first externally splined sliding sleeve referred to as the first sliding sleeve 691, and a second sliding sleeve also splined toward the exterior referred to as the second sliding sleeve 692, then its end referred to as the input shaft end 614. The sliding sleeves 691 and 692 are pushed relative to each other along the shaft in opposite directions by a compression spring 693 mounted around the shaft 610 and pressed at both ends against the two sliding sleeves respectively. Their longitudinal displacement in relation to the shaft 610 is limited, in the case of the first sliding sleeve 691, by a stop in the direction of the handwheel and carried by the shaft, and in the case of the second sliding sleeve 692, by a stop in the direction of the input shaft end 614, this second stop also being carried by the shaft (these two stops are constituted by shoulders on the shaft, the sliding sleeves being mounted in a reduced section thereof). Furthermore, the spring 693 is chosen so that, in the absence of any opposing force or obstacle, it pushes the two sliding sleeves simultaneously to the stops.

As in the first embodiment, the planet carrier 620 is mounted opposite the housing 600 by means of a bearing 621 coaxial with the input 602 and the output 603 pivot links and with the ring gear 601. The planet carrier 620 comprises one or more planets 622, all of which mesh with the ring gear 601. Their axes of rotation are parallel to the axis of rotation of the planet carrier 620.

As in the first embodiment, the planet carrier 620 comprises a through bore 623 coaxial with the input and output pivot links and with the ring gear.

The bore 623 is dimensioned to accommodate in its interior, the input shaft 610 with its sliding sleeves, or at least the first sliding sleeve 691. The through bore 623 comprises a splined cylindrical section referred to as the splined portion of the planet carrier 624, which is able to form a link with the sliding sleeves, which are complementary.

As in the first embodiment, the power transmission module 10 also comprises a bored pinion (already mentioned) 630 mounted with a pivot link 631 (non-slip) in relation to the housing 600 coaxially with the input shaft 610 and the output shaft 660 as well as with the planet carrier 620. This bored pinion 630 forms all or part of the sun gear of an epicyclic gear train based on the planet carrier 620, the ring gear 601 of which, constitutes the other planet pinion. The bored pinion 630 comprises external gear teeth, referred to as bored pinion teeth 632, which mesh with the planet(s) 622. Thus, the planets mesh with the bored pinion 630. As in the first embodiment, the bored pinion 630 comprises a through bore coaxial with the input shaft 610 and the through bore 623 of the planet carrier 620, this bore of the bored pinion being referred to as the drive receiving bore 635. On the surface of this drive receiving bore 635, the bored pinion 630 carries the splines known as drive coupling sliding splines 633, which have a long axial length, to allow shorter splines to slide off the external surface of the driver.

As in the first embodiment, the driver 640 is a hollow cylindrical part of revolution arranged coaxially with the input shaft 610 and the through bore 623 of the planet carrier 620. It has splines on its external surface, referred to as external drive splines 641. The drive coupling sliding splines 633 of the bored pinion 630 are engaged with the external drive splines 641. However, the drive-coupling sliding splines 633 of the bored pinion 630 are longer than the external drive splines 641, and these interact, in the configuration of FIG. 8, with the part of the drive coupling sliding splines 633 that are located on the side of the input pivot link 602.

As in the first embodiment, the driver 640 is a hollow, cylindrical part having general symmetry in revolution comprising a wall 645 transversal to the axis of the power transmission module 10.

The wall 645 constitutes, on the side of the input pivot link 602, a base for the bore of the driver opening out on the side of the input pivot link 602 side, referred to as the direct handwheel coupling bore 642.

The driver input bore or direct handwheel coupling bore 642 carries the splines on its surface, referred to as direct coupling splines 643, for coupling the driver to the input shaft 610, by means of the second sliding sleeve 692. These splines define a cylindrical section of the bore, which is followed, toward the bore entrance, toward the input pivot link 602, by a smooth cylindrical section, without splines.

As in the first embodiment, on the other side of the wall 645, the driver comprises splines directed toward the axis in its bore opening on the side of the output pivot link. This bore serves for coupling to the worm screw and the splines are drive output splines 647.

As in the first embodiment, the driver 640 comprises on its periphery, an annular peripheral surface for lateral support in a plane perpendicular to the axis, for lateral support of a spring, and facing the side of the housing on which the input shaft 610 is located.

Facing this annular peripheral surface 644 for lateral support, the planet carrier 620 comprises an annular surface for lateral support, in a plane perpendicular to the axis, for the lateral support of a spring, and facing the side of the housing on which the output shaft is located. This assembly is equivalent to the assembly shown in the first embodiment (the two assemblies are interchangeable): the compression spring 650, instead of pressing on the bored pinion, presses on the planet carrier 620, which is longitudinally fixed in relation to the housing, as is, the bored pinion. Pressing on one or the other therefore has the same effect and is tantamount to pressing on the housing. The compression spring 650 is thus positioned between the planet carrier 620 and the driver 640, which face each other, but above all it governs the sliding of the driver 640 in relation to the bored pinion 630 along the sliding splines.

As in the first embodiment, the output shaft 660 comprises external splines and is locked in axial translation by the translation stops 662 integrated into the housing 600. The output shaft 660 is also a hollow shaft comprising a bore referred to as the output shaft bore 663. A control rod 670 is inserted into the output shaft bore 663, and the control rod end 671 approaches the wall 645 of the driver, in a position referred to as the first control rod position P11, pressed into the housing 600, shown in FIG. 8.

An elongated spacer 699 is mounted through the wall 645, perpendicular to it and fixed in a sliding connection with its axis parallel to the shaft 610. It constitutes a stop with clearance for the shaft 610 and the rod 670, and allows thrust to be transferred from the shaft 610 to the rod 670 and vice versa, without moving the driver 640.

In FIG. 8, the input shaft 610 is coupled in its position P2 to the planet carrier 125 by the first sliding sleeve 691.

As shown in FIG. 8, in this neutral position, on the one hand, the control rod 670 has moved back into the housing 600 (this is the first control rod position P11), and the control rod end 671 has displaced the driver 640 toward the left, resulting in disengagement of the driver output splines 647 from the output shaft splines 661.

On the other hand, the first sliding sleeve 691 is engaged with the splined portion of the planet carrier 624 or is not, being then offset in the direction of the second sliding sleeve, 692, then compressing the spring 693, due to an angular offset between the splined portion of the planet carrier 624 and those of the first sliding sleeve 691.

And the second sliding sleeve 692 is engaged at the direct coupling splines 643 or is not, being then offset in the direction of the first sliding sleeve 691, then compressing the spring 693, due to an angular offset between the splines 643 of the driver and those of the second sliding sleeve 692.

Possibly, one of the two sliding sleeves is engaged, while the other is not, as a function of the gear ratio that was engaged at the time of passing to neutral.

There is also free rotation of the worm screw, in other words, the output shaft 660, in relation to the input shaft, since the worm screw is not connected to the driver 640.

In the configuration shown in FIG. 8, the compression spring 650 is compressed, and is ready to assist relative axial displacement of the driver 640 in relation to the bored pinion

630. However, it is kept compressed by the rod 670, which forces the handwheel spacer 699 toward the end of its stroke, as well as the driver on which it presses by means of the spacer 699. The driver thus compresses the spring 650.

Figure 9:
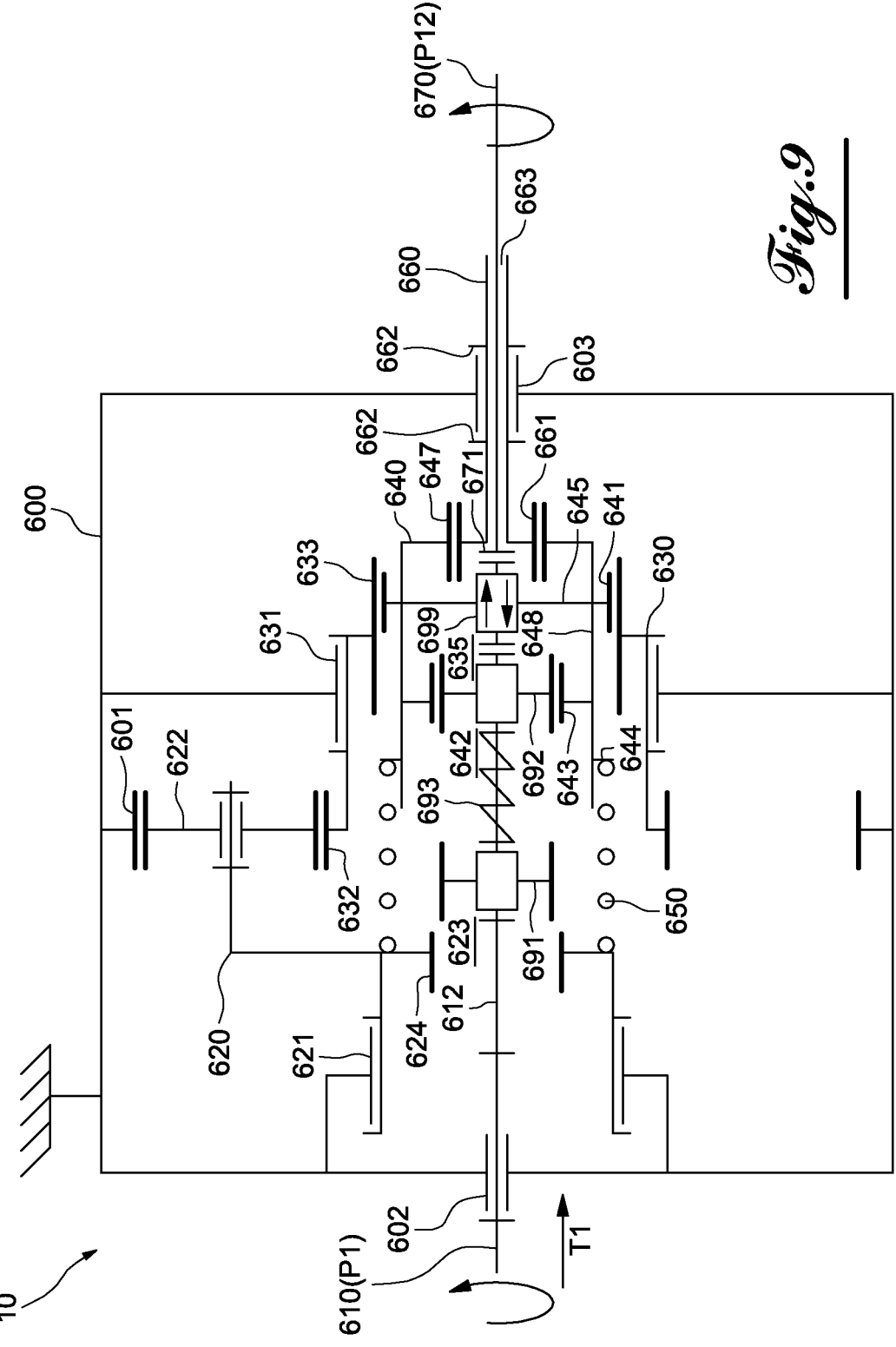

The transition from the configuration of FIG. 8 (one or other of the two sliding sleeves being engaged), to FIG. 9 will now be considered, by translation T1 of the handwheel and its shaft towards the interior of the housing.

This passage takes place in two stages, the first involving the spacer 699, which nevertheless remains optional in the invention.

The initial effect of the translation T1 (noted as the first translation) of the input shaft 610 toward the interior of the housing 600 by means of the input link 602, which has been described as a sliding pivot link, is as follows.

This translation requires an effort from the operator, who presses on the shaft 610, which in turn presses on the spacer 699, which meets the rod 670. The operator then counters the resistance offered by the rod 670. As the spacer reaches the end of its stroke, it displaces the driver.

This is aided by the compression spring 650, which naturally tends to push the driver 640 toward the part of the mechanism opposite the input link 602. Rapidly during this translation, the input shaft 610 is in a position referred to as the first input shaft position P1: the input shaft 610 is pushed into the housing 100. The driver 640 is also displaced toward the output link 603, and the spacer 699 is displaced toward the output link relative to the driver 640, as the input shaft is pressed against it, and only after having carried out this relative movement in relation to the driver has it been able to drive the latter toward the output shaft, in which it has been assisted by the spring 650.

In addition, the spacer 699 has immediately pushed the control rod 670 in the direction of the exterior of the housing. The control rod 670 is now displaced toward the exterior of the housing 600, in a second position of the control rod P12. The motor is disengaged accordingly, and the safety of the operator manipulating the handwheel is ensured.

At this stage, the driver has not engaged the output shaft (the worm screw) 660. A small amount of rotation may be required for the complementary splines 647 and 661 to engage, so therefore there may be resistance at this stage. Nevertheless, the motor is already disengaged thanks to the pressure of the input shaft on the spacer 699 and the displacement of the latter, which allows the control rod 670 to be pushed.

In addition, the first sliding sleeve 691 has disengaged from the splined portion of the planet carrier 624 (if it was engaged there), as the input shaft 610 has advanced in the housing, while the planet carrier 620 has not moved, and the sliding sleeve 691 is in abutment on the shaft 610 in the direction of the handwheel (the displacement of the shaft in the opposite direction to the handwheel therefore drives it in an identical movement).

The spring 650 is partially relaxed.

FIG. 9 shows the end result of translation T1 (noted as first translation) of the input shaft 610 toward the inside of the housing, after, if necessary, a small relative rotation of the driver and the output shaft, the spring 650 being fully relaxed.

The input shaft 610 drives the driver 640 in rotation.

The driver 640 is displaced toward the worm screw. After a relative transitional displacement, the driver and the spacer 699 have regained their relative positions with respect to each other as shown in FIG. 8, due to the resistance offered by the rod 670 and the pressure provided by the spring 650.

The transitional displacement of the spacer 699 is represented by the two arrows in its rectangle in the drawing.

The rotation of the two shafts, input and output, is therefore directly coupled (gear ratio equal to 1). The input shaft 610 therefore drives the output shaft 660 in rotation, without gear reduction.

Figure 10:
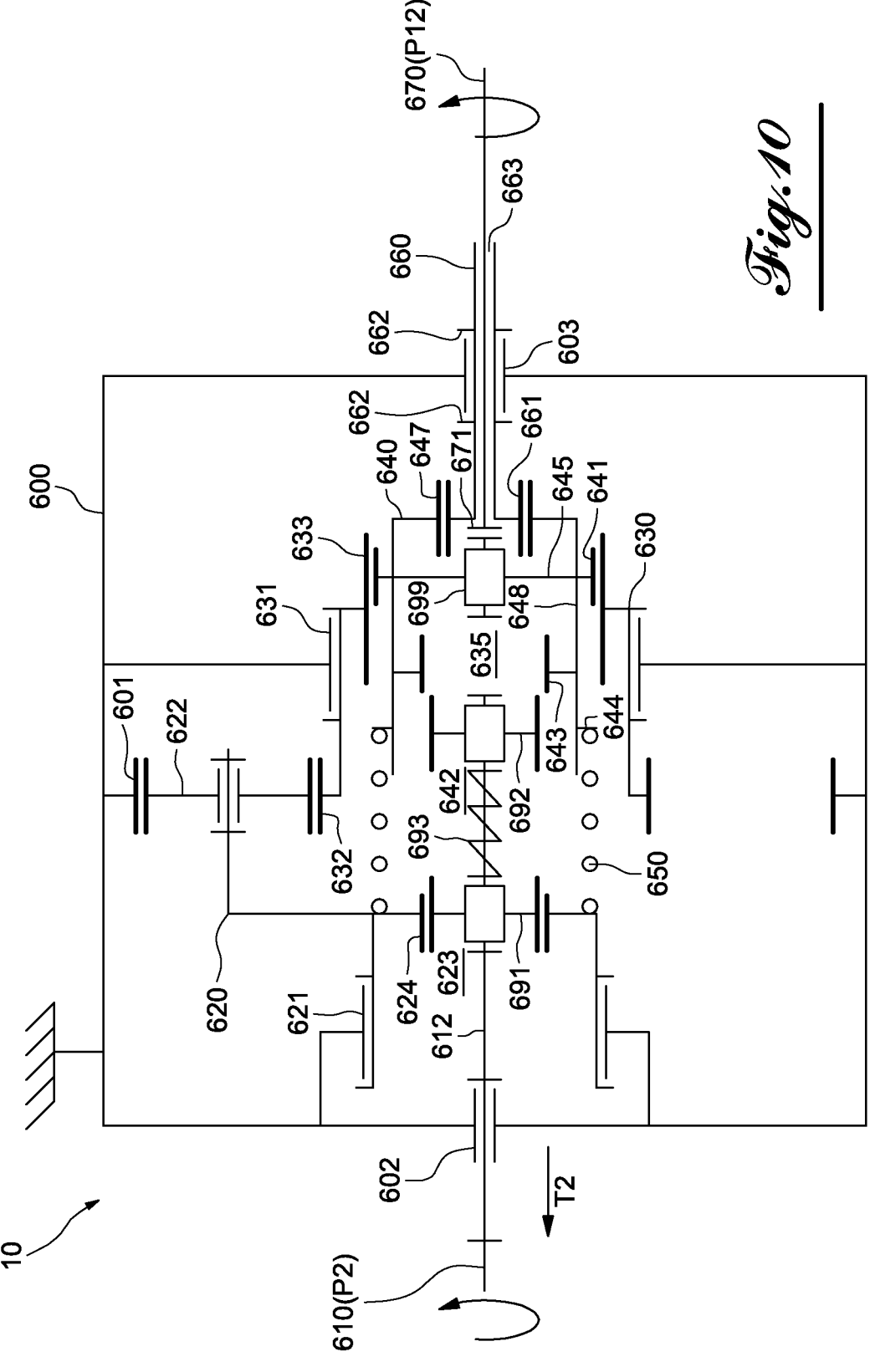

The consequence of a translation of the input shaft 610 toward the exterior of the housing 600 from the configuration of FIG. 9 will now be discussed, as shown in FIG. 10. This translation is noted as the second translation T2.

The input shaft 610 is moved toward the exterior as part of the input link 602, which has been referred to as a sliding pivot link.

Initially, the translation also has the effect of disengaging the second sliding sleeve 692 from the direct coupling splines 643 of the driver 640.

The compression spring 650 indeed holds the driver 640 in the position it occupied in FIG. 9. The output shaft splines 661 remain engaged with the drive output splines 647. However, the second sliding sleeve is driven toward the handwheel by the stop it encounters in the direction of the end of the shaft on which it is mounted.

On the other hand, the first sliding sleeve 691 may have difficulty engaging the splines of the planet carrier, if an angular offset constitutes a hindrance. In such a situation, the sliding sleeve displaces by compressing the spring 693. The fact that it slides on the shaft 610 allows to accommodate this difficulty, which is resolved as soon as a rotation is applied to the handwheel, thanks to the relaxation of the spring 693, which favors the engagement of the splines of the planet carrier and the first sliding sleeve 691. Since the planet carrier 620 is locked in axial translation, it therefore does not move back when the input shaft 610 moves back.

As a result, in FIG. 10, a rotation of the input shaft 610 about its axis causes rotation of the driver 640, the torque being transmitted by means of the planet carrier 620, the planets and the bored pinion 630, with a non-unitary gear ratio.

At the end of this translation T2, the input shaft 610 is in a position referred to as the second input shaft position P2, which is this one, or similar to the one, which had been presented in FIG. 8.

A further change of configuration will now be discussed, which may be the triggering of the electric motor of the servomotor. Starting from the configuration shown in FIG. 9 or the configuration shown in FIG. 10, in which the control rod is in its second position P12, a push on the control rod 670 toward the interior of the housing displaces the driver 640, by pressing the end of the control rod 670 against the spacer 699 which, once at the end of its stroke, drives the wall 645 and therefore the entire driver, toward the input pivot link 602, against the spring 650 which is then progressively compressed.

The translation therefore has the effect of disengaging the drive output splines 647 and the worm screw 661 (the output shaft).

Starting from the configuration shown in FIG. 9, the translation can have the effect of engaging the first sliding sleeve 691 with the splines of the planet carrier. Alternatively, the first sliding sleeve 691 can also move back toward the worm screw along the shaft, compressing the spring 693, if engagement of the splines is not easy due to angular misalignment, but the spring 693 forces the first sliding sleeve 691 to engage with the planet carrier as soon as such a possible angular misalignment is overcome, which occurs if the handwheel is turned.

Similarly, from the configuration shown in FIG. 10, the translation can have the effect of engaging the second sliding sleeve 692 with the direct coupling splines 643. Indeed, the input shaft 110 is in abutment and does not move back—the second sliding sleeve 692 can move back along the shaft toward the handwheel by compressing the spring 693, if the engagement of the splines is not easy due to angular misalignment, but the spring 693 forces the second sliding sleeve 692 to engage with the driver as soon as such a possible angular misalignment is overcome, which occurs if the handwheel is turned.

In all cases, the configuration shown in FIG. 8 is retained, with the control rod 670 in its first position P11, in other words, pushed into the housing 600. Thus, the sliding sleeves allow the difficulties of engaging the splined shafts and the complementary splined bores to be overcome, which can occur when the splines are not very fine. Thus, it is possible to choose an embodiment without a sliding sleeve, but with very fine splines.

And the optional sliding spacer 699, allows the electric motor to be disengaged before engaging the manual control, when switching from the configuration of FIG. 8 (neutral) to the configuration of FIG. 9 (direct coupling-gear ratio equal to 1).

ESM servomotor assembly

1 handwheel
2 electric motor
21 electric motor rotor
3 impeller
4 worm screw
5 clutch release system
6 through-actuator
61 actuating rod
62 motor connection spring
10 power transmission module
100, 600 housing
101, 601 crown gear
102, 602 input pivot link
103, 603 output shaft connection
110, 610 input shaft
111 first splines of the input shaft 691 first sliding sleeve
112 non-splined shaft portion
113 second splines of the input shaft 692 second splined sliding sleeve
693 small compression spring
114 input shaft end (present but not referenced, to simplify the drawing, in embodiment 2)
115 positioning pin
120, 620 planet carrier
121, 621 bearing
122, 622 planets
123, 623 through hole
124, 624 splined portion of the planet carrier
125 non-splined portion of planet carrier bore
130, 630 bored pinion
131, 631 pivot link
132, 632 bored pinion teeth
133, 633 drive-coupling sliding splines
134 annular surface for lateral support
135, 635 drive-receiving bore
140, 640 driver
141, 641 external drive splines
142, 642 direct handwheel coupling bore
143, 643 direct coupling splines
144, 644 annular peripheral surface for lateral support
145, 645 solid wall 146 worm coupling bore (present but not referenced in the 2nd embodiment to simplify the drawing)

147, 647 drive output splines 148 non-splined portion of direct coupling bore 150, 650 compression spring 160, 660 output shaft 161, 661 output shaft splines 162, 662 travel stops 163, 663 output shaft bore 170, 670 control rod 171, 671 control rod end 180 position selection leaf spring 181 first position indication space 182 second position indication space P1 first input shaft position P2 second input shaft position T1 first axial translation of input shaft T2 second axial translation of the input shaft P11 first position of the control rod P12 second position of the control rod

The invention claimed is:

1. A mechanical power transmission module comprising a housing and a plurality of coaxially mounted mechanical parts, said plurality of mechanical parts forming an epicyclic gear train, one of the inputs/outputs of which is immobilized in relation to the housing, the other two inputs/outputs of the epicyclic gear train being formed by an input assembly and an output assembly, power being furthermore supplied to the plurality of mechanical parts by an input shaft of the transmission module coaxial with the parts of the plurality of mechanical parts, the input shaft being coupled to the output assembly by means of the input assembly in a first axial position (P1) of the input shaft in relation to the housing defining a first gear ratio of the transmission module, the transmission module being further characterized in that the input assembly comprises a central through-bore, said through-bore and the input shaft carrying complementary splines for coupling the input shaft with the input assembly, the input shaft slidably mounted in relation to the housing, sliding in the through-bore to couple with the output assembly in a second position (P2) of the input shaft in relation to the housing, differing from the first position (P1) by an axial translation (T2), in which said complementary splines are no longer engaged, and which defines a second gear ratio of the transmission module, the output assembly comprising a bored pinion coupled to the input assembly by external teeth and a central driver, mounted one relative to the other in an axial sliding link, the driver comprising bearing means to withstand an axial thrust in one direction by a control rod and to withstand an axial thrust by the input shaft in the other direction, and the splines for coupling to and uncoupling from an output and added from of the transmission module, coupling means of the output assembly with the input shaft comprises the splines carried by a central bore of the output assembly open toward the through bore and the splines carried by the input shaft, the splines carried by a central bore of the output assembly open toward the through bore and the splines carried by the input shaft are carried by means of a sliding sleeve referred to as the output sliding sleeve, and-a compression spring pushes the output sliding sleeve to aid the engagement of said splines of the coupling means.

2. The mechanical power transmission module according to claim 1, wherein the complementary splines for coupling the input shaft to the input assembly are carried by said through bore and the input shaft by means of a sliding sleeve referred to as the input sliding sleeve, and the compression spring pushes the two sliding sleeves back, one in relation to the other.

3. The mechanical power transmission module according to claim 1, wherein said input assembly constitutes the planet carrier of the epicyclic gear train provided with its planet gears, coupled without reduction to the input shaft in the first position (P1), the through bore being a bore of the planet carrier.

4. The mechanical power transmission module according to claim 1, wherein the bearing.

5. The mechanical power transmission module according to claim 1, wherein a leaf spring of the transmission module is present between the input assembly and a bearing connecting the input shaft and the housing, retains the shaft despite its weight, and cooperates with a form carried by the input shaft to signal to an operator axially displacing the input shaft that it has reached the first or the second position.

6. The mechanical power transmission module according claim 1, wherein the input shaft in the first position (P1) is pressed into the housing less than in the second position (P2).

7. The mechanical power transmission module according to claim 1, wherein the mechanical power transmission module is configured for initial commissioning of an electric servomotor on a valve or vane for controlling a fluid flowing in a pipeline, or for a safety operation on said valve, the valve or vane being operated by means of a transmission shaft carrying an impeller, the input shaft being coupled to a handwheel constituting a manual control, the output assembly being coupled to a worm screw which engages the impeller.

8. A mechanical power transmission module comprising a housing and a plurality of coaxially mounted mechanical parts, said plurality of mechanical parts forming an epicyclic gear train, one of the inputs/outputs of which is immobilized in relation to the housing, the other two inputs/outputs of the epicyclic gear train being formed by an input assembly and an output assembly, power being furthermore supplied to the plurality of mechanical parts by an input shaft of the transmission module coaxial with the plurality of mechanical parts, the input shaft being coupled with the output assembly by means of the input assembly in a first axial position (P1) of the input shaft in relation to the housing defining a first gear ratio of the transmission module, the transmission module being further characterized in that the input assembly comprises a central through bore, said through bore and the input shaft carrying complementary splines for coupling the input shaft with the input assembly, the input shaft slidably mounted in relation to the housing, sliding in the through bore to couple with the output assembly in a second position (P2) of the input shaft in relation to the housing, differing from the first position (P1) by an axial translation (T2), in which said complementary splines are no longer engaged, and which defines a second gear ratio of the transmission module, the output assembly comprising a bored pinion coupled to the input assembly by external teeth and a central driver, mounted one in relation to the other in an axial sliding connection, the driver comprising a wall to withstand an axial thrust in one direction by a control rod and to withstand an axial thrust by the input shaft in the other direction, and the splines for coupling to and uncoupling from an output of the transmission module, a spring being positioned so as to oppose sliding of the driver in relation to the bored pinion when the input shaft is displaced in relation to the output assembly.

\* \* \* \* \*